(12) United States Patent
Brant et al.

(10) Patent No.: US 7,363,137 B2
(45) Date of Patent: Apr. 22, 2008

(54) CONSTRUCTION EQUIPMENT DISCOVERY ON A NETWORK

(75) Inventors: Dmitry Brant, Richmond Heights, OH (US); Edward D Hillen, Painesville, OH (US); Stephen R Cole, University Heights, OH (US)

(73) Assignee: Lincoln Global, Inc., Monterey Park, CA (US)

(*) Notice: Subject to any disclaimer, the term of this patent is extended or adjusted under 35 U.S.C. 154(b) by 0 days.

(21) Appl. No.: 11/050,172

(22) Filed: Feb. 3, 2005

(65) Prior Publication Data

US 2006/0173619 A1 Aug. 3, 2006

(51) Int. Cl.
*G01C 21/00* (2006.01)

(52) U.S. Cl. .................. 701/50; 701/213; 56/10.2 A; 340/988

(58) Field of Classification Search ............... 701/213, 701/50, 207, 221; 340/539.13, 995.1, 988; 445/456.1; 56/10.2 A
See application file for complete search history.

(56) References Cited

U.S. PATENT DOCUMENTS

| | | | | |
|---|---|---|---|---|
| 5,375,663 A * | 12/1994 | Teach | ....................... | 172/4.5 |
| 6,037,901 A * | 3/2000 | Devier et al. | ............ | 342/357.17 |
| 6,624,388 B1 * | 9/2003 | Blankenship et al. | .... | 219/130.5 |
| 6,771,609 B1 * | 8/2004 | Gudat et al. | ................ | 370/254 |
| 7,030,811 B2 * | 4/2006 | Goren et al. | ................ | 342/387 |
| 2002/0018015 A1 * | 2/2002 | Roch | ..................... | 342/357.13 |
| 2002/0156556 A1 * | 10/2002 | Ruffner | ....................... | 701/23 |
| 2003/0185237 A1 * | 10/2003 | Baker, Jr. | ................... | 370/469 |
| 2004/0039527 A1 * | 2/2004 | McDonald et al. | ......... | 701/213 |
| 2004/0210371 A1 * | 10/2004 | Adachi et al. | ................ | 701/50 |
| 2005/0064878 A1 * | 3/2005 | O'Meagher | ............. | 455/456.1 |
| 2005/0128083 A1 * | 6/2005 | Puzio et al. | ............. | 340/572.1 |
| 2005/0197115 A1 * | 9/2005 | Clark et al. | ............. | 455/426.1 |
| 2005/0222933 A1 * | 10/2005 | Wesby | ......................... | 705/36 |
| 2006/0041632 A1 * | 2/2006 | Shah et al. | ................. | 709/217 |
| 2006/0080442 A1 * | 4/2006 | Ferguson et al. | ........... | 709/226 |

* cited by examiner

*Primary Examiner*—Tuan C To
(74) *Attorney, Agent, or Firm*—Amin, Turocy & Calvin, LLP

(57) ABSTRACT

Systems and methodologies that facilitate a search for construction equipment(s) (e.g., a welding terminal) via a locator component that searches a networked area as defined by a plurality of reference points. Upon locating a network address of the construction unit, a physical location of such unit on the network, or the reference points, can also be determined via employing technologies such as a Global Positioning System (GPS), angle and Time Difference of a Signal's Arrival (TDOA), probabilistic analysis of strength of a wireless signal with respect to the reference points and the like. Also, a composition of welding equipments employed on the construction site can be determined and/or configured.

19 Claims, 11 Drawing Sheets

CONSTRUCTION EQUIPMENT DISCOVERY ON A NETWORK

TECHNICAL FIELD

The subject invention relates generally to construction management and equipment lay out, and in particular to searching and tracing of construction equipment (e.g., welding units, power supplies and the like) on a construction site that incorporates a networked area for such equipment.

BACKGROUND OF THE INVENTION

Construction management can span various phases of a project's life cycle, from preliminary feasibility analysis and concept development through to commissioning of the project. Typically, a goal of effective construction management is to integrate the design and construction phases of a project while keeping it on schedule and within budget, and ensuring a completed product of the highest quality. If construction management of a project is flawed various problems can arise, such as; cost overruns, time overruns, substandard building quality, or even structural failure. Thus, to ensure that all project objectives are fully met, construction management staff utilize their engineering skill, experience, and knowledge of construction contracting to develop realistic schedules, prepare accurate construction estimates, analyze alternative designs, study labor conditions, perform value engineering, and effectively coordinate the activities of the construction team.

At the same time, management of Construction sites, especially large scale construction sites with numerous equipment deployed thereon, are increasingly becoming more complex. Construction equipment can be positioned at far way distances from the management control center. Moreover, the movement of materials gravel, dirt, and the like at construction sites, can require constant re-positioning of the construction equipment through out the site. As such, gathering data regarding location of the construction equipment, their maintenance requirement and over all state can be a challenging task.

Similar problems typically exist in massive assembly line operations (e.g., automotive operation) wherein the proper lay out, and location of assembly equipment can play an important role in the efficiency and productivity of an assembly line or plant.

For example, in such assembly lines positioning of welding terminals and their proper maintenance can play an important role in over all assembly line efficiency. Such welding systems are often deployed over great distances in larger manufacturing environments and many times are spread across multiple manufacturing centers. Given the nature and requirements of modern and more complex manufacturing operations, however, welding systems designers, architects and suppliers face increasing challenges in regard to upgrading, maintaining, controlling, servicing and supplying various welding locations. Unfortunately, many conventional welding systems operate in individually controlled and somewhat isolated manufacturing locations in regard to the overall assembly process. Thus, controlling, maintaining, servicing and supplying multiple and isolated locations in large centers and/or across the globe has become more challenging, time consuming and expensive.

One such challenge relates to locating, communicating with, servicing and troubleshooting welding systems. For example, mobile welding system(s) can be located on construction sites, large ship yard and even barges in the ocean. Conventional welding systems often require engineers to travel to physically remote locations in order to provide service and/or troubleshooting support.

Another challenge facing welding systems relates to maintenance. Welders are often maintained and serviced according to procedures implemented by operators of the welding systems. Although some operators may adequately service and maintain these systems, quality of the service and maintenance is often up to the training and competence of the individual operator. Thus, a large collection of well-maintained welders servicing an overall assembly process may be at the mercy of another welding system that is not properly serviced or maintained. This may cause the process to stop or be disrupted during service outages relating to a poorly maintained welder. Even under the best of circumstances, however, given that many welding systems are operating in an isolated manner, diagnostic information relating to the health of these systems is often not reported or discovered until after a breakdown occurs.

Therefore, there is a need to overcome the aforementioned exemplary deficiencies associated with conventional systems and devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention provides for systems and methods that facilitate searching for construction equipment(s) (e.g., a welding terminal) via a locator component, which searches for a network address in a networked area as defined by a plurality of reference points, and a mapping component that can map a physical location of the construction unit(s) to its respective network address.

The physical location of the references points and/or the associated construction equipment capable of receiving and/or transmitting (transceiving) data, can be determined via employing technologies such; as a Global Positioning System (GPS), defining a cellular network via reference points with proximity detectors to evaluate distance of a unit from a reference point, angle and Time Difference of a Signal's Arrival (TDOA), probabilistic analysis of strength of a wireless signal with respect to the receiving reference points with proximity detectors, and the like. Various artificial intelligence schemes can also be employed for location differentiation of construction equipment relative to the reference points. The networked area can be part of Local Area Network (LAN) or a Wide Area Network (WAN), wherein a construction equipment can be associated with a respective reference point, and in communication with a central host. Such an arrangement further facilitates management of the construction unit by operators in communication with the central host, for example, for troubleshooting, maintenance, reserving, development and/or servicing of the unit.

In a related aspect, when employing a portable construction unit in a multi level floor structure or construction site, various reference points can be assigned to specific floor levels, and supply information regarding the presence of the portable construction unit in such floors, to the central host unit. For example, the portable construction equipment can be equipped with transceiving capabilities to identify itself to a reference point of a particular floor via a cellular referencing and/or signaling mechanism with proximity detectors. Such reference points can in turn supply the information to the central host unit regarding the whereabouts of the portable construction unit on a floor level. Additional information regarding a status of the portable construction equipment (e.g., remaining power supply, maintenance requirement, and the like) can also be supplied to the reference points by the construction equipment and forwarded to the central host for an analysis thereof.

According to a further aspect of the subject invention, the central host can transmit data associated with an identified construction equipment (e.g., its physical location, network address, whether such equipment is in use or reserved for other operation, and the like) to computing equipment that manage and/or monitor operation of such units. For example, the central host can exchange data related to the welding terminal (e.g., location, status) to a portable wireless communication device (e.g., personal data assistant or laptop computer) that can be carried by on site construction personnel. As such, a user (e.g., weld engineer or operator) utilizing such portable wireless communication device can communicate information to the welding terminal (e.g., parameter settings and load new weld procedures) via the central host. The user is further able to retrieve information from the welding terminal (e.g., wire usage, error logs and diagnostic information).

In yet a further aspect of the subject invention, the locator component can employ a socket arrangement, wherein the construction equipment initially identifies itself to a network and a central host unit via a socket bound to a specific port number. Such socket can function as one end point of a two-way communication link between programs running on a network or the central unit, and it can be bound to a port number for identification purposes during data communication. Likewise, on the central host unit the port number to which the construction unit communicates with can be identified. To initiate a connection, the central host unit can attempt a rendezvous with the construction equipment on the port associated with such equipment. Upon acceptance of the connection, a new socket (and consequently a new port) can be assigned, so that the construction equipment can continue to listen to the original socket for connection request, while supplying data to the central host unit via the newly created socket. In a related aspect, an association component can determine a type of the construction equipment (e.g., whether a welding, power supply and the like.)

The subject invention can also determine a composition of welding equipments employed on the construction site. For example, it can be determined: which units are the master machines and which equipment are the slaves; and/or whether a welding unit is part of a greater assembly and the number of welders working as a part thereof, and/or whether a certain network address represents a system interface module. Also, a determination can be made as to whether submerged arc cell configurations are employed, and the composition of such welding systems. In addition, upon locating the network address of the welding units, a welding cell configuration can be built via a tree structure that can represent the logical layout of a cell configuration or arc system. Moreover, the type of software option associated with the welding unit can be determined, to supply the proper course of action for diagnostics, maintenance and the like.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
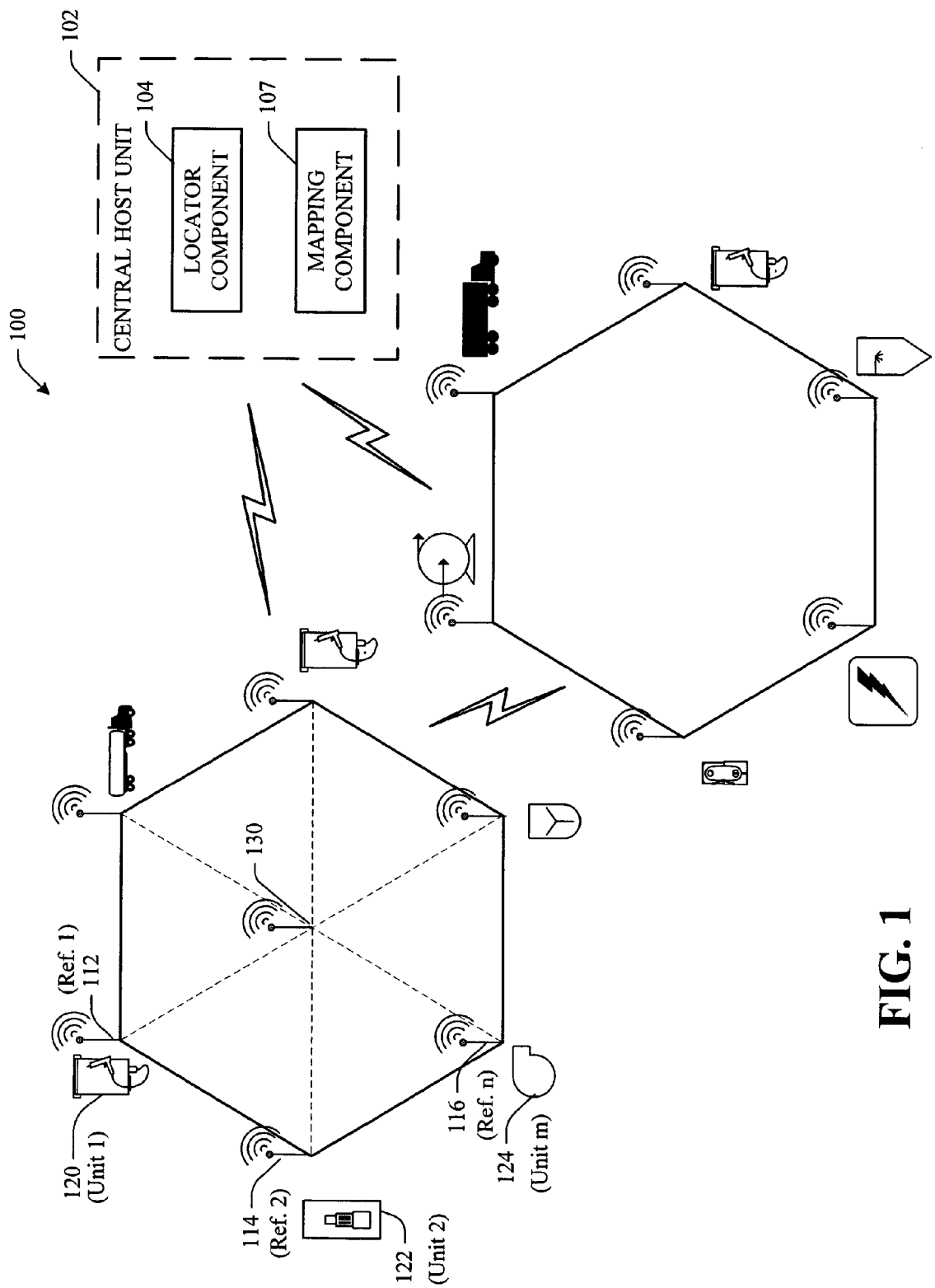
FIG. 1 illustrates a site layout and schematic block diagram of a central host unit with a locator component that searches a networked area as defined by a plurality of reference points.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like, in addition to mechanical elements, are intended to refer to a computer-related entity—either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

The subject invention provides for systems and methods that facilitate a search for construction equipment on a construction site, or in a factory layout, via a locator component that searches a networked area as defined by a plurality of reference points. Referring initially to FIG. 1, a network system 100 that can be searched via a locator component 104 is illustrated. The locator component 104 can be part of applications running on a central host unit 102, which can function as a management control center for the network system 100. Moreover, the mapping component 107 can associate the identified physical location of the construction equipment with a network address for such equipment. Thus, a computer generated and processable map of the construction site can be developed, wherein the physical location and network address of a construction unit is determined and matched.

The network system 100 can be a system area network or other type of network, and can be defined via a series of reference points 112, 114, 116 (reference points 1 to n, where n is an integer). Each reference point can be associated with and/or designated as a location of a construction equipment 120, 122, 124 (construction units 1 to m, where m is an integer) with transmitting/receiving capabilities. Such reference points 112, 114, 116 can also be in communication with additional sub-reference points (e.g., node 130) to further delineate the layout 100 in a triangular fashion for higher resolution.

The network system 100 can further include additional hosts (not shown), which may be personal computers, servers or other types of computers. Such hosts generally can be capable of running or executing one or more application-level (or user-level) programs, as well as initiating an I/O request (e.g., I/O reads or writes). In addition, the network system 100 can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters. Construction units 120, 122, 124 can be scattered though out the network system 100, and the locator component 104 can initially determine a network address followed by locating a physical location of such construction equipment, as described in more detail infra.

Figure 2:
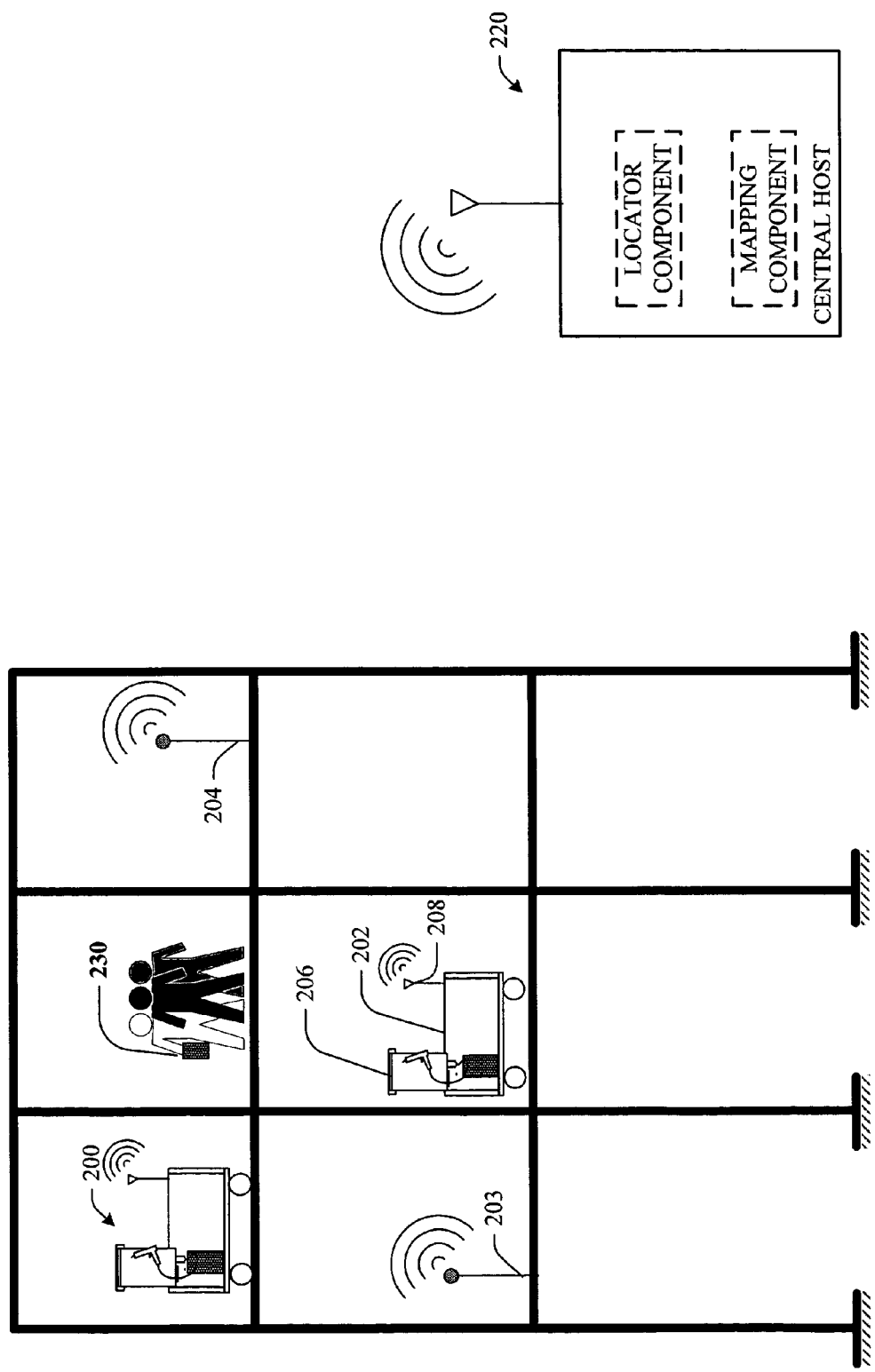
FIG. 2 illustrates a portable construction device in a multi level floor structure in accordance with an aspect of the subject invention.

FIG. 2 illustrates a portable construction device in a multi level floor structure in accordance with an aspect of the subject invention. As illustrated, the portable construction device 200 can be a welding terminal that includes a rack system 202, a welding device with a power supply 206 and a communication component 208. The compactness and portability of such welding terminals 200 can make them well suited to employment in remote locations. Such welding terminals are self-sufficient, and typically do not require additional equipment to be fully functional.

For example and as illustrated in FIG. 2, when employing the portable construction unit in a multi level floor structure or construction site, various reference points can be assigned to specific floor levels (e.g., reference points 203 and 204 to the first and second levels respectively), to supply information regarding the presence of the portable welding terminal 200 in such floors, to the central host unit 220. As such, the portable welding terminal 200 can be equipped with transceiving capabilities to identify itself to a reference point of a particular floor via a signaling mechanism and/or proximity detectors (not shown) and the like. Such reference points 203, 204 can in turn supply the gathered information to the central host unit 220 regarding the whereabouts of the portable welding terminal 200 on a particular floor level. Additional information regarding a status of the portable welding terminal (e.g., remaining power supply, maintenance requirement, and the like) can also be supplied to the reference points 203, 204 by such unit and then forwarded to the central host 220 for an analysis thereof. Such an arrangement can also be employed when application of a GPS system is not feasible, for example as in closed area assembly plants.

In a related aspect of the subject invention, the central host 220 can transmit data associated with an identified construction equipment (e.g., its physical location, network address, whether such equipment is in use or reserved for other operation, maintenance requirement and the like) to portable computing equipment(s) used by personnel (e.g., hand held navigation tools), which can manage and/or monitor operation of such units. For example, the central host 220 can exchange data related to the welding terminal 200 (e.g., location, status) to a portable wireless communication device 230 (e.g., personal data assistant or laptop computer) that can be carried by on site construction personnel.

Figure 3:
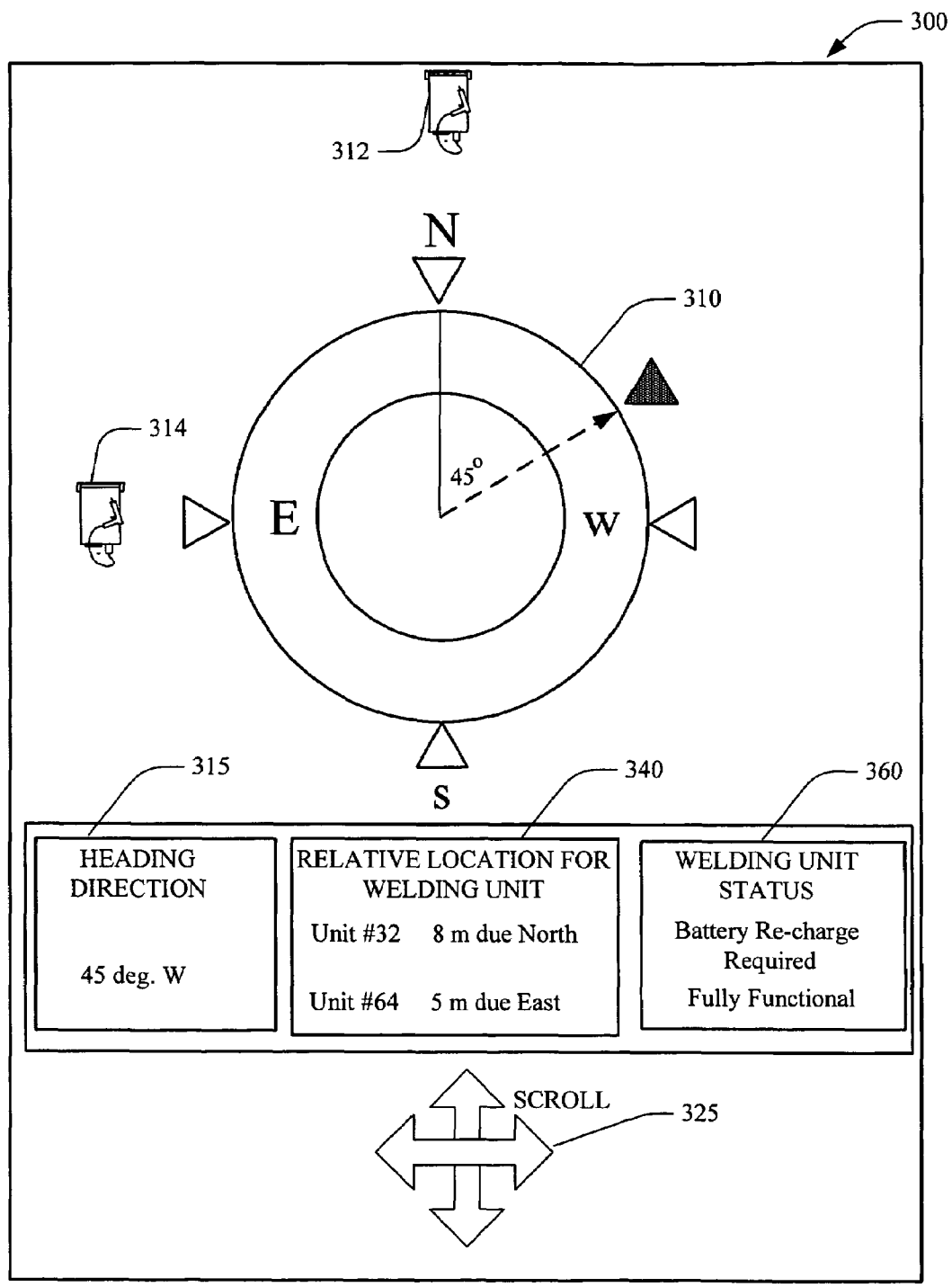
FIG. 3 illustrates an exemplary display for a portable computing/navigation device with a compass system, in accordance with an aspect of the subject invention.

FIG. 3 illustrates an exemplary display 300 for such a portable navigation device that can include a GPS navigation and a compass system, which can show locations of the welding equipment 312, 314 on the display 300 of the portable unit. The compass rose 310 can provide information thru a three-axis magnetic sensor and a two axis tilt sensor. Such three axis magnetic sensor can measure strength of the earth magnetic field in each of the x, y, and z directions at the location of the navigation device, while the two-axis tilt sensor measures the orientation of the unit in pitch and roll as referenced to a known reference, such as the gravity vector (locally leveled tangent plane). A processor (not shown) associated with the portable device can calculate a heading (e.g., direction of travel by a user) based upon the sensed magnetic field strengths and tilt information, and the GPS data.

For example, the transformation of the sensed magnetic field strengths and tilt information to a heading (displayed as area 315) can be accomplished via three dimensional vector processing of magnetometer and/or inclinometer data. Thus, by determining a header and direction of travel, the map display can be scrolled by the user via scroll button 325 to view map of the surroundings and any available welding unit, or be notified of a location thereof via the segment 340 of the display. Moreover, maintenance data related the welding units so displayed can be indicated at area 360 of the display unit. As such, location of a nearest welding unit (e.g., relative to the location of a user) and its maintenance status can be viewed by the user, and the user can prioritize maintenance activities accordingly (e.g., recharge the power supply of the most drained welding unit before other units).

Figure 4:
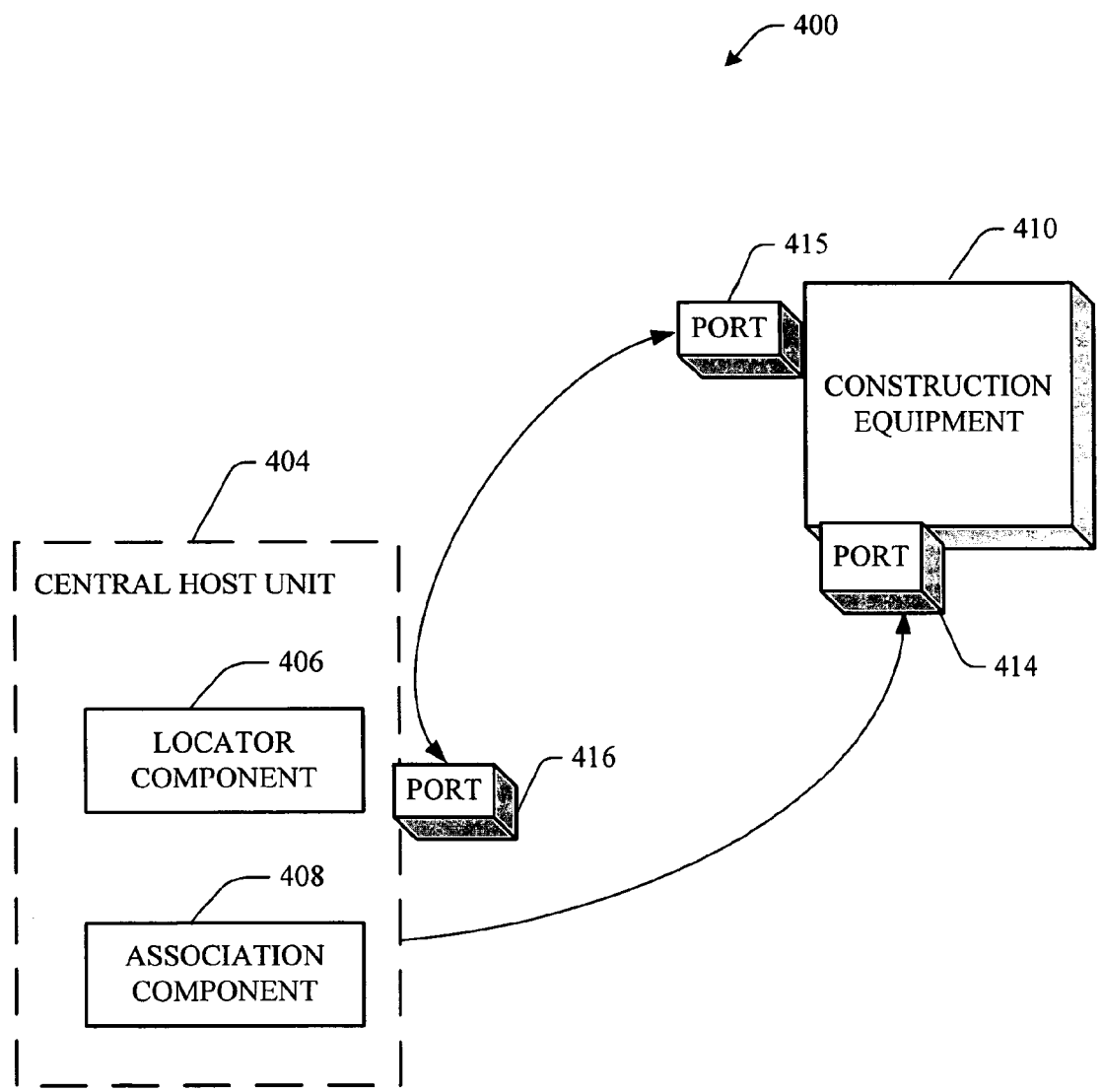
FIG. 4 illustrates a block diagram for a central host unit with a locator component communicating with a construction equipment in accordance with an aspect of the subject invention.

FIG. 4 illustrates a block diagram 400 for a central host unit 404 with a locator component 406 in accordance with an aspect of the subject invention. The locator component 406 can employ a socket arrangement, wherein the construction equipment 410 initially identifies itself to the network and the central host unit 410 via a socket bound to a specific port number 414. Such socket can function as one end point of two-way communication link between programs running on a network or the central host unit 404, and it can be bound to a port number for identification purposes during data communication. Likewise, on the central host unit 404 the port number 416 to which the construction unit communicates with, can be identified. To initiate a connection, the central host unit can attempt a rendezvous with the construction equipment on the port 414 associated with such equipment. Upon acceptance of the connection, a new socket (and consequently a new port 415) can be assigned, so that the construction equipment 410 can continue to listen to the original socket for connection request, while supplying data to the central host unit 404 via the newly created socket. In a related aspect of the subject invention an association component 408 can determine a type of construction unit, and whether it is a desired unit to which communication is requested. For example, the construction equipment 410 can be a mobile welding system.

Figure 5:
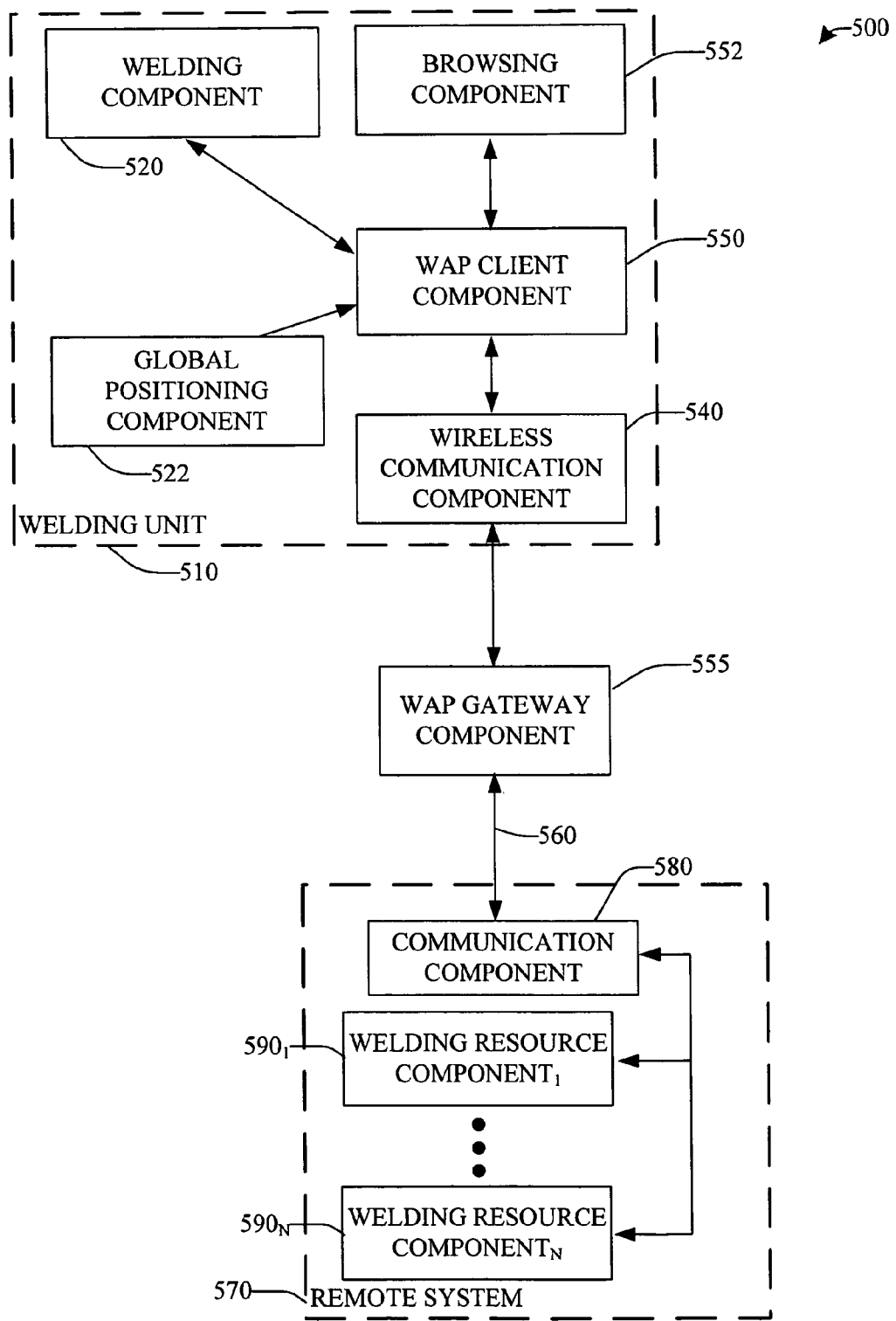
FIG. 5 illustrates a welding system that facilitates wireless communication and identification to a central host unit in accordance with an aspect of the subject invention.

FIG. 5 illustrates a welding system 500 that facilitates wireless communication and identification to a central host unit in accordance with an aspect of the subject invention. The welding system 500 includes a welding component 520, a Wireless Application Protocol (WAP) client component 550 and a wireless communication component 540. The welding component 520 can include node(s) of a welding cell and/or associated peripheral device(s), for example, test equipment, monitoring equipment, a consumable usage monitor, an arc/weld monitor and/or a welding data store.

The WAP client component 550 facilitates transfer of information between the welding component 520 and the central host unit and/or other device(s) on the network (not shown). The WAP client component 550 can receive information from the welding component 520 and place it into a format, for example, a Wireless Markup Language (WML) document, for transmission to other device(s) (not shown) via the wireless communication component 540. Moreover, the WAP client component can receive information (e.g., WML and/or WML script document(s)) from other device(s) (not shown) via the wireless communication component 540.

As illustrated in FIG. 5, the wireless communication component 540 facilitates communication between the welding unit 510 and other devices (not shown), for example, a WAP gateway, a computer system and/or a personal digital assistant. The wireless communication component 540 can utilize post second generation mobile communications technology (e.g., 5 G) to communicate with other device(s) (e.g., WAP gateway 555). In addition, the wireless communication component 540 can include software that is reprogrammable, and can further communicate via one channel and/or shift among multiple channels, for example, depending on the type of communication being performed (e.g., voice, data and/or high-speed data). Such wireless communication component 540 can employ a particular communications modality based upon a priority level, for example. Furthermore, the wireless communication component 540 can be adapted to perform cognitive function(s) to facilitate communications. As such, the wireless communication component 540 can determine frequencies available for communication (e.g., temporary use), determine cost(s) associated with communication on each of the frequencies, negotiate usage rights with the owner(s) of the channels.

In a related aspect of the subject invention, the wireless communication component 540 can further monitor the quality of transmission and/or receipt of information and adaptively modify the transmission frequency. It is to be appreciated that wireless communications component 540 can include means for mobile communications that are embedded within the welding unit 510, for example a printed circuit board equipped with a mobile communication chip set (not shown), and/or external to the welding unit 510, for example, a mobile phone (not shown) serving as a mobile communication modem for the welding unit 510.

In a further aspect of the subject invention, a welding system 500 being employed on a remote construction site can communicate with a central host unit and/or a manufacturer's Internet web site to facilitate troubleshooting of the welding system 500. A welding component 520, for example, a welding power source detecting an unexpected voltage setting, can communicate with the central host unit and/or manufacturer's Internet web site by initiating communication via the WAP client component 550. The WAP client component 550 can generate information (e.g., WML and/or WML script document) to be transmitted to the central host unit and/or manufacturer's Internet web site (e.g., a request for information and/or application engineer assistance) via the wireless communication component 540. The wireless communication component 540 can determine a priority level associated with the information generated by the WAP client component 550, for example, based on a user's request and/or a predetermined priority level. The wireless communication component 540 can utilize an appropriate modality of communication. For example, the user can determine that due to contractual responsibilities (e.g., damages related to delay), an otherwise time indifferent request should be given high priority.

The welding system 500 can further include a browsing component 552 facilitating user interface of the welding system 500 with other devices (not shown). The browsing component 552 can include a microbrowser for receiving, for example, WML document(s) and/or an HTTP client. Thus, via the browsing component 552, a user of the welding system 500 can access welding resource(s) via the Internet.

The welding system 500 can, optionally, further include a global positioning component 522 facilitating identification of a geographical location of the welding system 500. For example, the global positioning component 522 can receive signal(s) from Global Positioning Satellites (GPS) and forward associated geographical location information to the WAP client component 550 for transmittal to remote device(s) (not shown).

As such, the global positioning component 522 can facilitate troubleshooting of the welding unit 510 remotely by a welding application engineer by providing information regarding the geographical location of the welding unit 510. For example, transmission of live streaming video to troubleshooter(s) at a manufacturer's location and/or field service office. Such information can be initially transferred to the central host unit. The central host unit can assess the urgency of the situation, and then notify the proper maintenance crew. Accordingly, resources of the construction site can be properly and efficiently managed. Alternatively, the information can be sent directly to the maintenance crew via the welding unit.

For example, a user of the welding unit 510 can communicate with the remote system 570 via the browsing component 552 (e.g., microbrowser). The user can request information via the browsing component 552. The request for information is transmitted to the WAP client component 550 which formats the request for transmission to the WAP gateway component 555 (e.g., via WML and/or WML script document(s). The request is then communicated to the WAP gateway component 555 by the wireless communication component 540 (e.g., utilizing post second generation mobile communication technology). The WAP gateway component 555 can then process the request for information by, for example, examining welding resource component 590 via the network connection 560 (e.g., the Internet). The remote system 570 can send information back to the welding unit 510 (e.g., via HTML document(s), WML script document(s) and/or WML document(s)) via the WAP gateway component 555. The WAP gateway component 555 can process (e.g., translate the information into WML document(s)) and forward information back to the wireless communication component 540. In turn, the wireless communication component 540 processes the information and forwards it onto the WAP client component 550. Finally, the WAP client component 550 can process (e.g., utilizing a WML scripting language) and present information to the user via the browsing component 552 (e.g., microbrowser).

Figure 6:
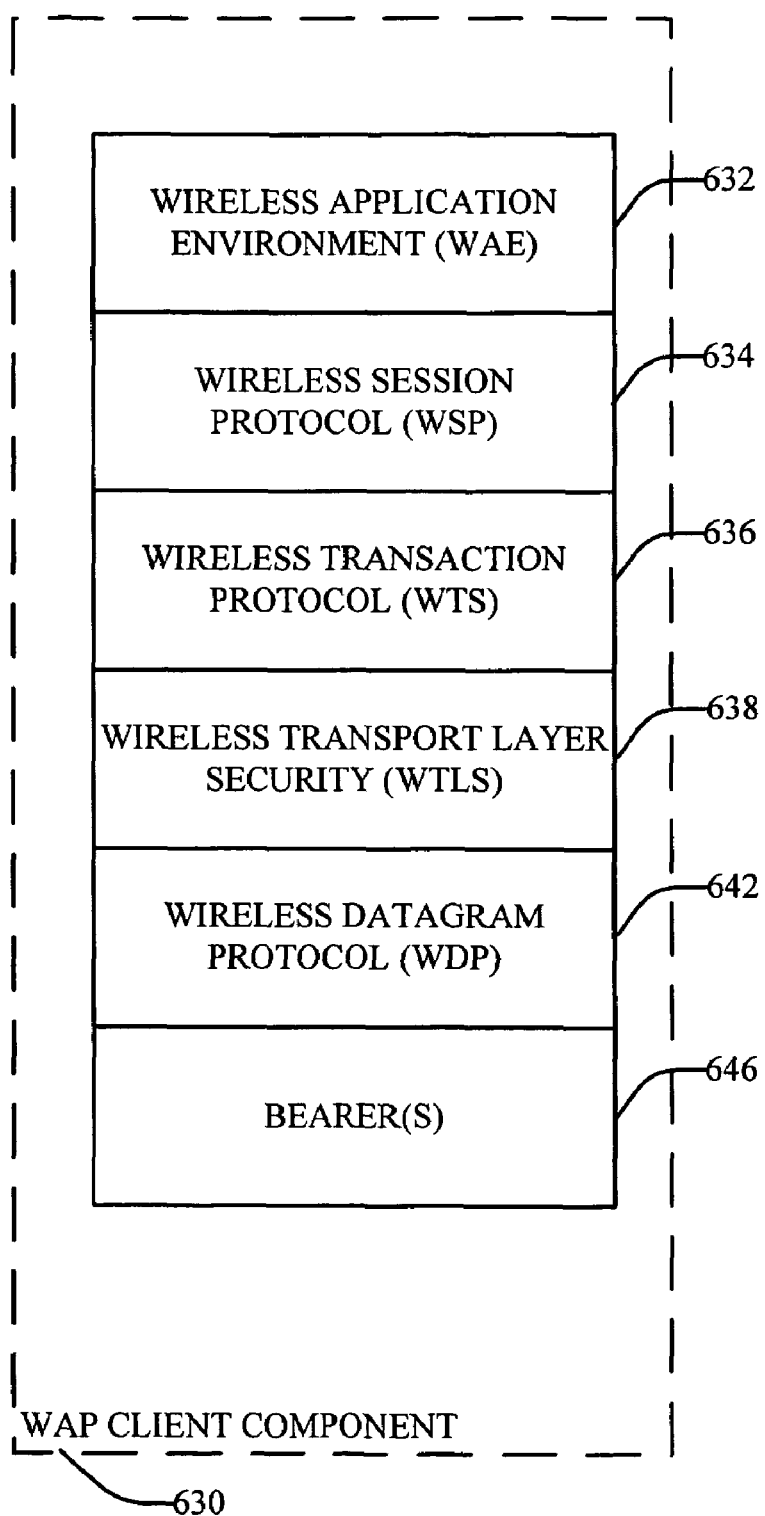
FIG. 6 illustrates a hierarchical representation of a WAP client component that can be employed as part of the subject invention.

Referring to FIG. 6, a hierarchical representation of a WAP client component 630 is illustrated. The WAP client component 630 can include a Wireless Application Environment (WAE) 632, a Wireless Session Protocol (WSP) 634, a Wireless Transaction Protocol 636, a Wireless Transport Layer Security (WTLS) 638, a Wireless Datagram Protocol (WDP) 642 and bearer(s) 646.

The Wireless Application Environment (WAE) 632 can define, for example, a user interface. The Wireless Application Environment (WAE) 632 can include a scripting language (e.g., a WML scripting language) for utilizing information (e.g., WML document(s)) received by the WAP client component 630.

The Wireless Session Protocol (WSP) 634 facilitates communication between one of two session services: a connection oriented session service operating above the Wireless Transaction Protocol 636 and a connectionless service operating above the Wireless Datagram Protocol (WDP) 642.

The Wireless Transaction Protocol 636 runs on top of a datagram service (e.g., user Datagram Protocol (UDP)) and is part of a standard suite of TCP/IP protocols. The Wireless Transaction Protocol 636 provides a simplified protocol suitable for low bandwidth mobile station(s) and generally offers three classes of transaction service: unreliable one way request, reliable one way request and reliable two way request respond. The Wireless Transaction Protocol 636 is adapted to optimize the transfer of information between the welding system and the remote system, for example the central host unit.

The Wireless Transport Layer Security (WTLS) 638 facilitates secure communication between the welding system and the WAP gateway component. The Wireless Transport Layer Security (WTLS) 638 can incorporate security features that based upon the established Transport Layer Security (TLS) protocol standard. Also such Wireless Transport Layer Security (WTLS) 638 can further include data integrity checks, privacy between the welding system and the WAP gateway component.

Wireless Datagram Protocol (WDP) 642 facilitates hierarchically higher layer(s) of the WAP client component 630 to be independent of the physical layer (e.g., bearer(s) 646) of the WAP client component 630. The Wireless Datagram Protocol (WDP) 662 adapts the bearer(s) 646 thus presenting a consistent data format to higher layer(s) of the WAP client component 630.

The bearer(s) 646 facilitate the transfer of information from the WAP client component 630 to other device(s), for example, the WAP gateway component. The bearer(s) 646 can facilitate the transfer of information via different formant(s), for example, depending upon relative cost(s), amount(s) of information to be transferred and/or priority. Moreover, the bearer(s) 646 can utilize Unstructured Supplementary Service Data (USSD) which generally facilitates communication of information which is primarily numeric data and/or when speed of access is an important consideration. USSD is not a store and forward service and is session-oriented such that when a user accesses a USSD service, a session is established and the radio connection stays open until the user, application, or time out releases it. Further, the bearer(s) 646 can utilize Short Message Service (SMS), Circuit Switched Data (CSD) and/or General Packet Radio Service (GPRS).

Figure 7:
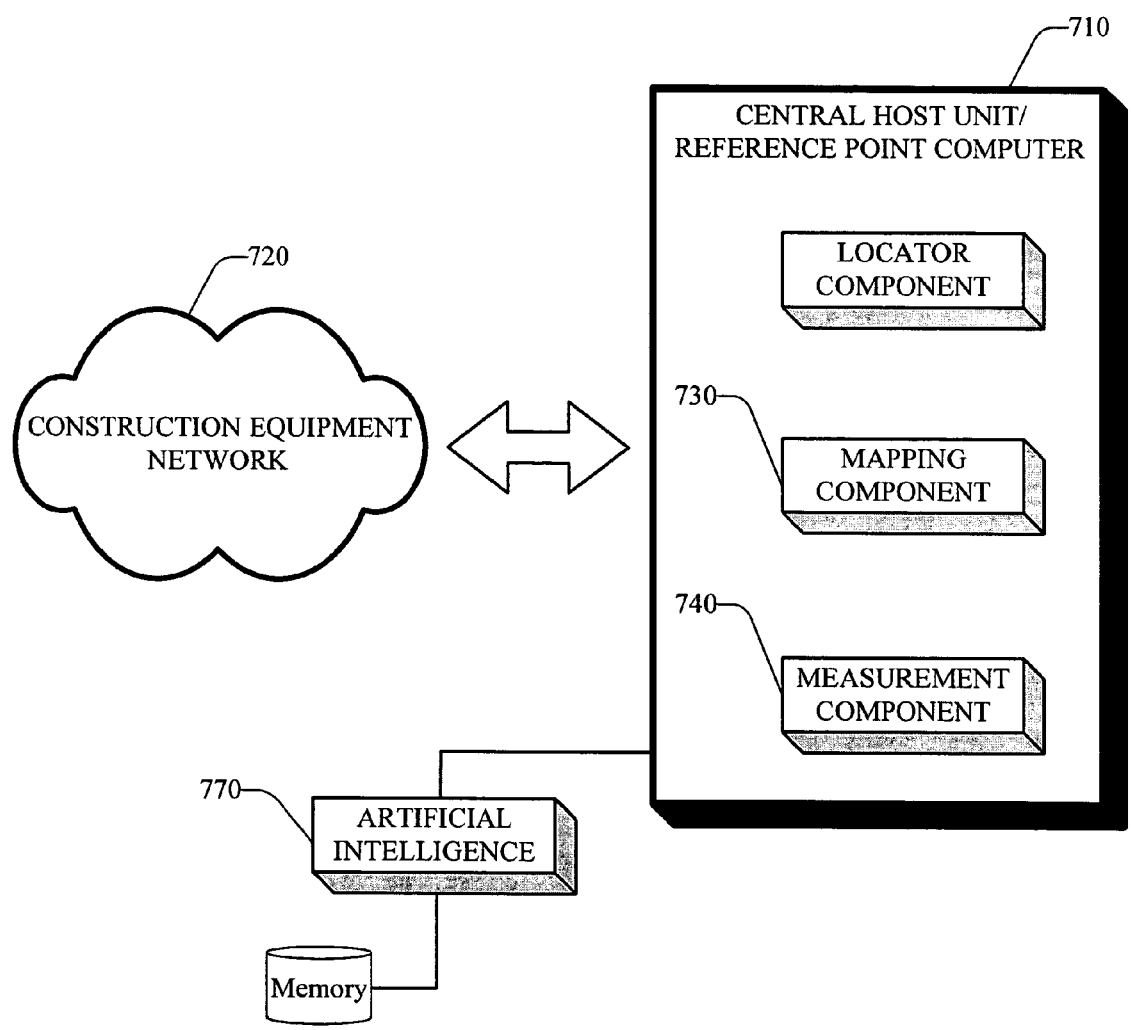
FIG. 7 illustrates a block diagram associated with applications running on the central host unit and/or within a computer environment associated with the reference points that define the network area.

FIG. 7 illustrates a block diagram associated with applications running on the central host unit host terminal and/or within a computer environment associated with the reference points 710 that define the network area 720. As illustrated, a mapping component 730 can associate the identified physical location of the construction equipment with a network address for such equipment. Thus, a computer generated and processable map of the construction site can be developed, wherein the physical location and network address of a construction unit is determined and matched. In a related aspect, a measurement component 740 can receive, as an input, a signal strength derived from wireless signals associated with the construction equipment. It is to be appreciated that such measurement component can also receive raw signal and then process such raw signals to obtain a signal strength data thereof. The signal strength can be forwarded to an artificial intelligence component 770 for an inference relating to the position of the construction unit relative to the location of the central host unit and/or reference point 710.

Accordingly, the subject invention (e.g., in connection with determining a relative position of a construction unit) can employ various artificial intelligence based schemes for carrying out various aspects thereof. For example, a process for determining which region the construction unit is located can be facilitated via an automatic classification system and process. Such classification can employ a probabilistic and/or statistical-based analysis (e.g., factoring into the analysis utilities and costs) to prognose or infer an action that is desired to be automatically performed. For example, a support vector machine (SVM) classifier can be employed. A classifier is a function that maps an input attribute vector, x=(x1, x2, x3, x4, xn), to a confidence that the input belongs to a class—that is, f(x)=confidence(class). Other classification approaches include Bayesian networks, decision trees, and probabilistic classification models providing different patterns of independence can be employed. Classification as used herein also is inclusive of statistical regression that is utilized to develop models of priority. As will be readily appreciated from the subject specification, the subject invention can employ classifiers that are explicitly trained (e.g., via a generic training data) as well as implicitly trained (e.g., via observing system behavior, receiving extrinsic information) so that the classifier(s) is used to automatically determine according to a selected criteria which regions to choose. For example, with respect to SVM's it is to be appreciated that other classifier models may also be utilized such as Naive Bayes, Bayes Net, decision tree and other learning models—SVM's are configured via a learning or training phase within a classifier constructor and feature selection module.

Figure 8:
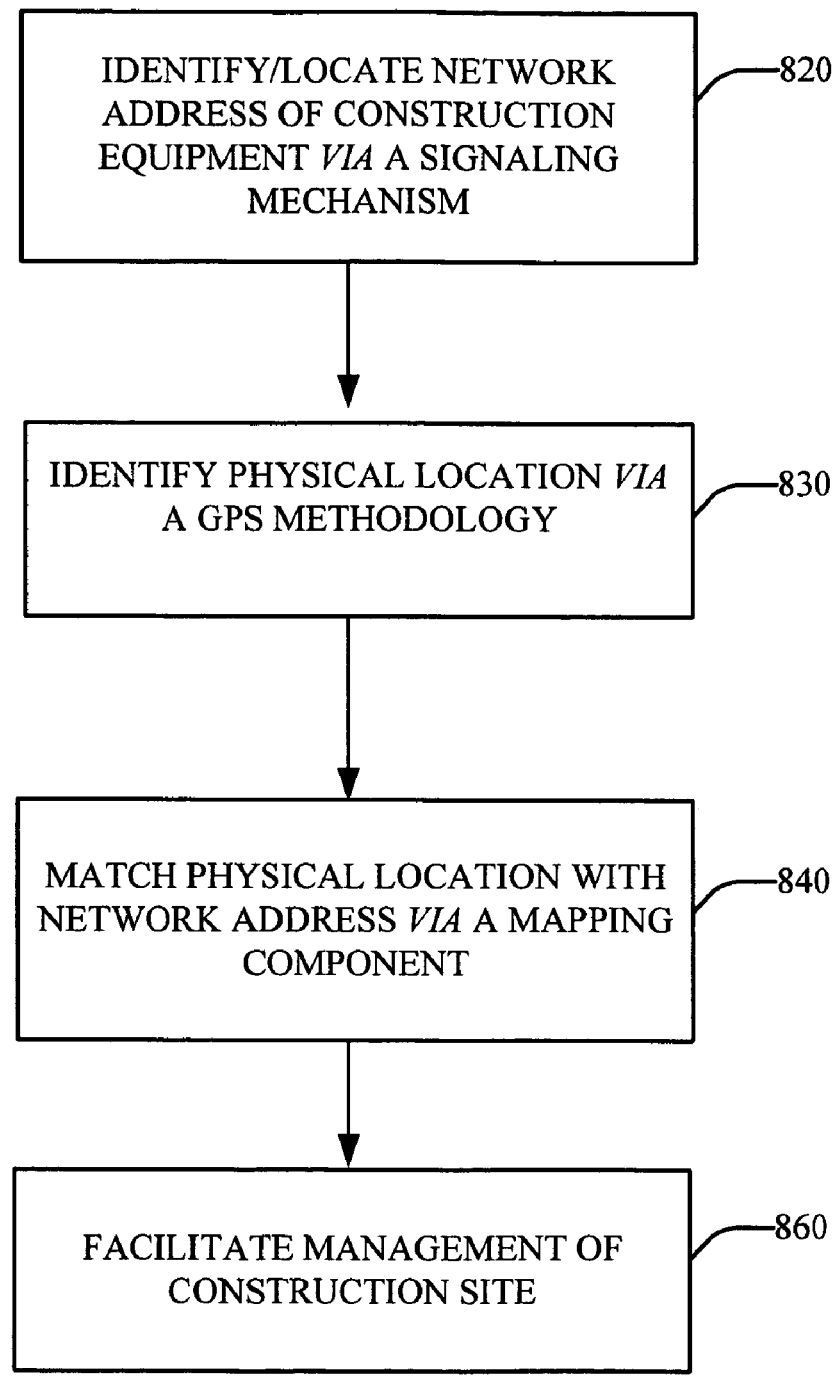
FIG. 8 illustrates a flow chart for locating construction equipment(s) in accordance with an aspect of the subject invention.

FIG. 8 illustrates a flow chart for locating a construction unit in accordance with an aspect of the subject invention. Initially, and at 820 the construction devices attached to the network are discovered and/or identified via a signaling mechanism as described in detail supra by the central host unit. For example, a locator component of the central host unit can employ a discovery protocol in the form of "who is out there" and the other construction units connected to the network system publish "I am", with such participants describing their state (e.g., whether they are actively employed, being reserved for an upcoming task, and the like.) Next, and at 820 the physical location of such construction units can be identified via employing a GPS mechanism as described in detail supra.

A mapping can then be initiated to match the physical location of the construction unit with its network address, at 840. Such can facilitate management (troubleshooting, maintenance, reserving, development and/or servicing of the unit) of the construction unit by operators in communication with the central host. Subsequently and at 880, proper management can be applied for efficiently employing the construction unit.

While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

Figure 9:
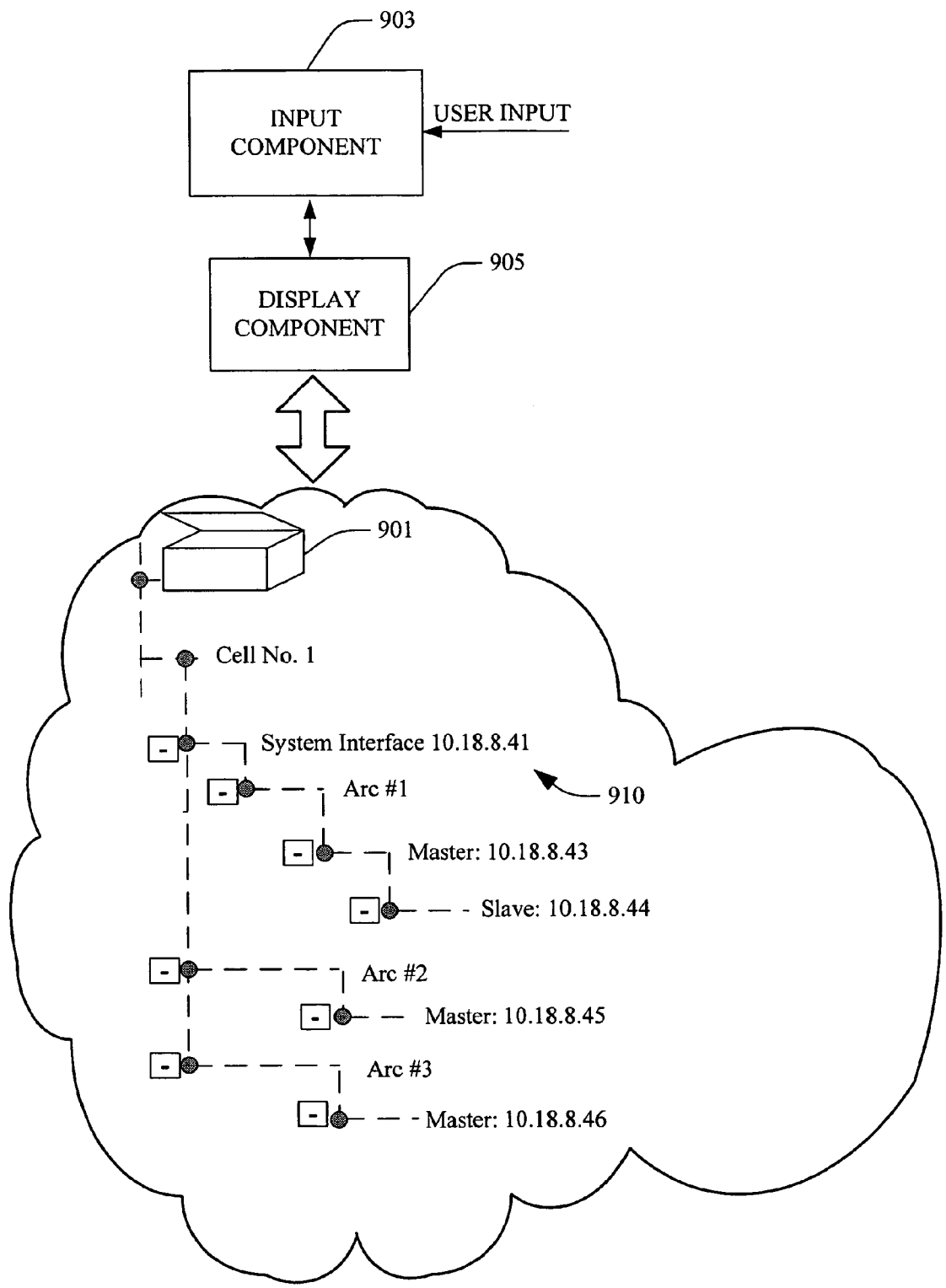
FIG. 9 illustrates a schematic diagram of a weld cell hierarchy structure that can be configured in accordance with an aspect of the invention.

Upon locating a network address for welding unit(s), the subject invention can determine which units are the master machines and which are the slaves, and/or whether a welding unit is part of a greater assembly, and the number of welders working as a part thereof, and/or whether a certain network address represents a system interface module. Also, a determination can be made to verify whether submerged arc cell configuration(s) are employed, and the nature of the welding system. FIG. 9 illustrates a schematic for a welding cell configuration that can be built via a tree structure, which represents the logical layout of an arc system. An input component 903 receives instructions from a user who is interacting with a list of welding units 901. The input component 903 can include a computer keyboard, mouse, pointing device(s), voice activated computer component and the like. The input component 903 receives information from a user who intends to access and/or build a cell configuration, for example.

As illustrated at 910, a welding unit (e.g., having a network address of 10.18.8.41) that functions as a system interface for cell no. 1, can include a plurality of arc welders, wherein arc #1 can comprise a master device (e.g., at network address of 10.18.8.43) and a slave device (e.g., at network address of 10.18.8.44). As such, the subject invention can display via the display component 905 the cell layout; and provide a desired configuration based on the connections between the plurality of machines detected.

Figure 10:
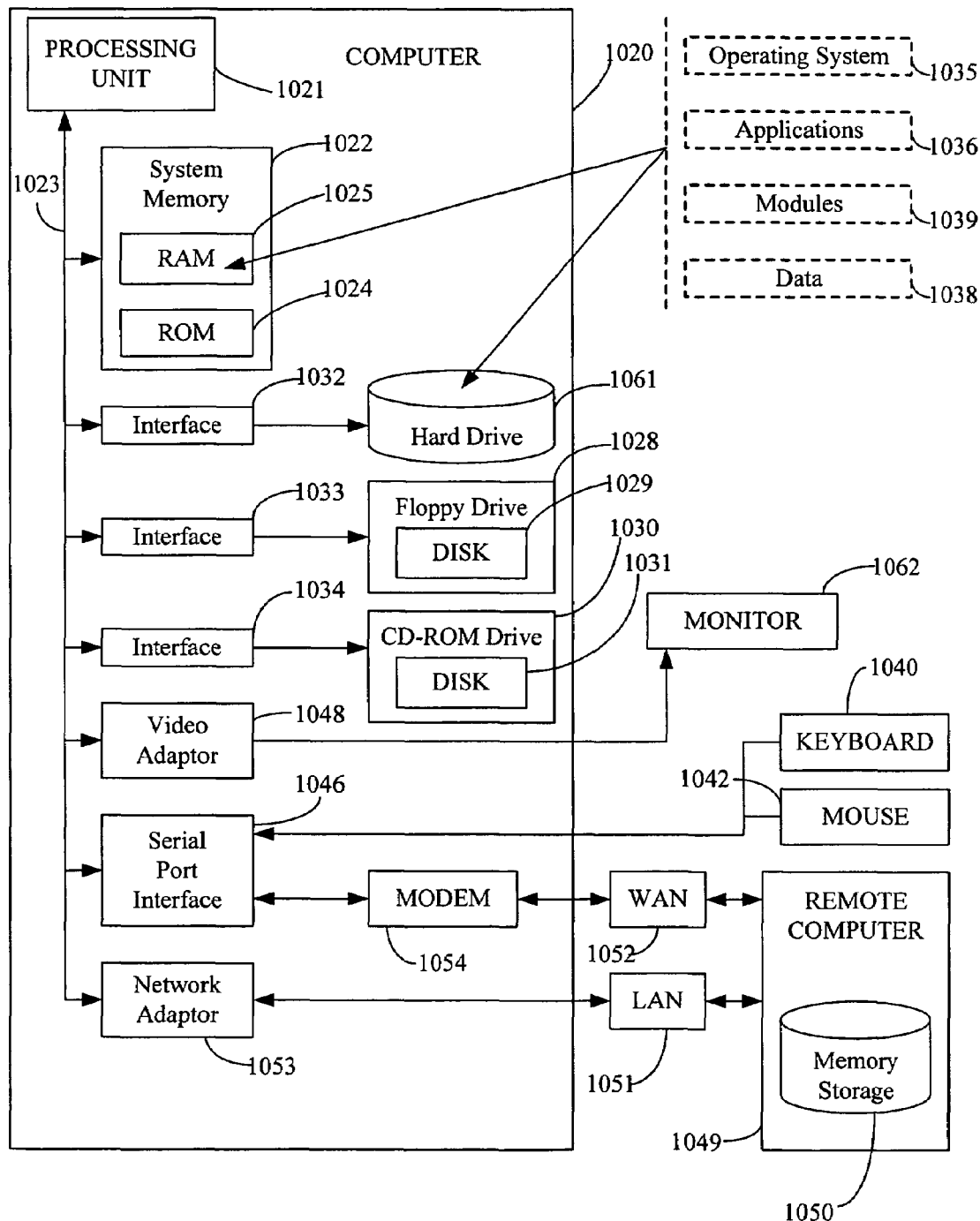
FIG. 10 illustrates a brief, general description of a suitable computing environment, which can be part of the central host unit or reference point computing unit, wherein the various aspects of the subject invention can be implemented.

Referring now to FIG. 10, a brief, general description of a suitable computing environment, which can be part of the central host unit, or the computing environment of reference point and construction unit, is illustrated wherein the various aspects of the subject invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary environment includes a computer 1020, including a processing unit 1021, a system memory 1022, and a system bus 1023 that couples various system components including the system memory to the processing unit 1021. The processing unit 1021 can be any of various commercially available processors. Dual microprocessors and other multi-processor architectures also can be used as the processing unit 1021.

The system bus can be any of several types of bus structure including a memory bus or memory controller, a peripheral bus, and a local bus using any of a variety of commercially available bus architectures. The system memory may include read only memory (ROM) 1024 and random access memory (RAM) 1025. A basic input/output system (BIOS), containing the basic routines that help to transfer information between elements within the computer 1020, such as during start-up, is stored in ROM 1024.

The computer 1020 further includes a hard disk drive 1029, a magnetic disk drive 1028, e.g., to read from or write to a removable disk 1029, and an optical disk drive 1030, e.g., for reading from or writing to a CD-ROM disk 1031 or to read from or write to other optical media. The hard disk drive 1029, magnetic disk drive 1028, and optical disk drive 1030 are connected to the system bus 1023 by a hard disk drive interface 1032, a magnetic disk drive interface 1033, and an optical drive interface 1034, respectively. The drives and their associated computer-readable media provide nonvolatile storage of data, data structures, computer-executable instructions, etc. for the computer 1020. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject invention.

A number of program modules can be stored in the drives and RAM 1025, including an operating system 1035, one or more application programs 1036, other program modules 1039, and program data 1038. The operating system 1035 in the illustrated computer can be substantially any commercially available operating system.

A user can enter commands and information into the computer 1020 through a keyboard 1040 and a pointing device, such as a mouse 1042. Other input devices (not shown) can include a microphone, a joystick, a game pad, a satellite dish, a scanner, or the like. These and other input devices are often connected to the processing unit 1021 through a serial port interface 1046 that is coupled to the system bus, but may be connected by other interfaces, such as a parallel port, a game port or a universal serial bus (USB). A monitor 1049 or other type of display device is also connected to the system bus 1023 via an interface, such as a video adapter 1048. In addition to the monitor, computers typically include other peripheral output devices (not shown), such as speakers and printers.

The computer 1020 can operate in a networked environment using logical connections to one or more remote computers, such as a remote computer 1049. The remote computer 1049 may be a workstation, a server computer, a router, a peer device or other common network node, and typically includes many or all of the elements described relative to the computer 1020, although only a memory storage device 1050 is illustrated in FIG. 10. The logical connections depicted in FIG. 10 may include a local area network (LAN) 1051 and a wide area network (WAN) 1052. Such networking environments are commonplace in offices, enterprise-wide computer networks, Intranets and the Internet.

When employed in a LAN networking environment, the computer 1020 can be connected to the local network 1051 through a network interface or adapter 1053. When utilized in a WAN networking environment, the computer 1020 generally can include a modem 1054, and/or is connected to a communications server on the LAN, and/or has other means for establishing communications over the wide area network 1052, such as the Internet. The modem 1054, which can be internal or external, can be connected to the system bus 1023 via the serial port interface 1046. In a networked environment, program modules depicted relative to the computer 1020, or portions thereof, can be stored in the remote memory storage device. It will be appreciated that the network connections shown are exemplary and other means of establishing a communications link between the computers can be employed.

In accordance with the practices of persons skilled in the art of computer programming, the subject invention has been described with reference to acts and symbolic representations of operations that are performed by a computer, such as the computer 1020, unless otherwise indicated. Such acts and operations are sometimes referred to as being computer-executed. It will be appreciated that the acts and symbolically represented operations include the manipulation by the processing unit 1021 of electrical signals representing data bits which causes a resulting transformation or reduction of the electrical signal representation, and the maintenance of data bits at memory locations in the memory system (including the system memory 1022, hard drive 1029, floppy disks 1028, and CD-ROM 1031) to thereby reconfigure or otherwise alter the computer system's operation, as well as other processing of signals. The memory locations wherein such data bits are maintained are physical locations that have particular electrical, magnetic, or optical properties corresponding to the data bits.

Figure 11:
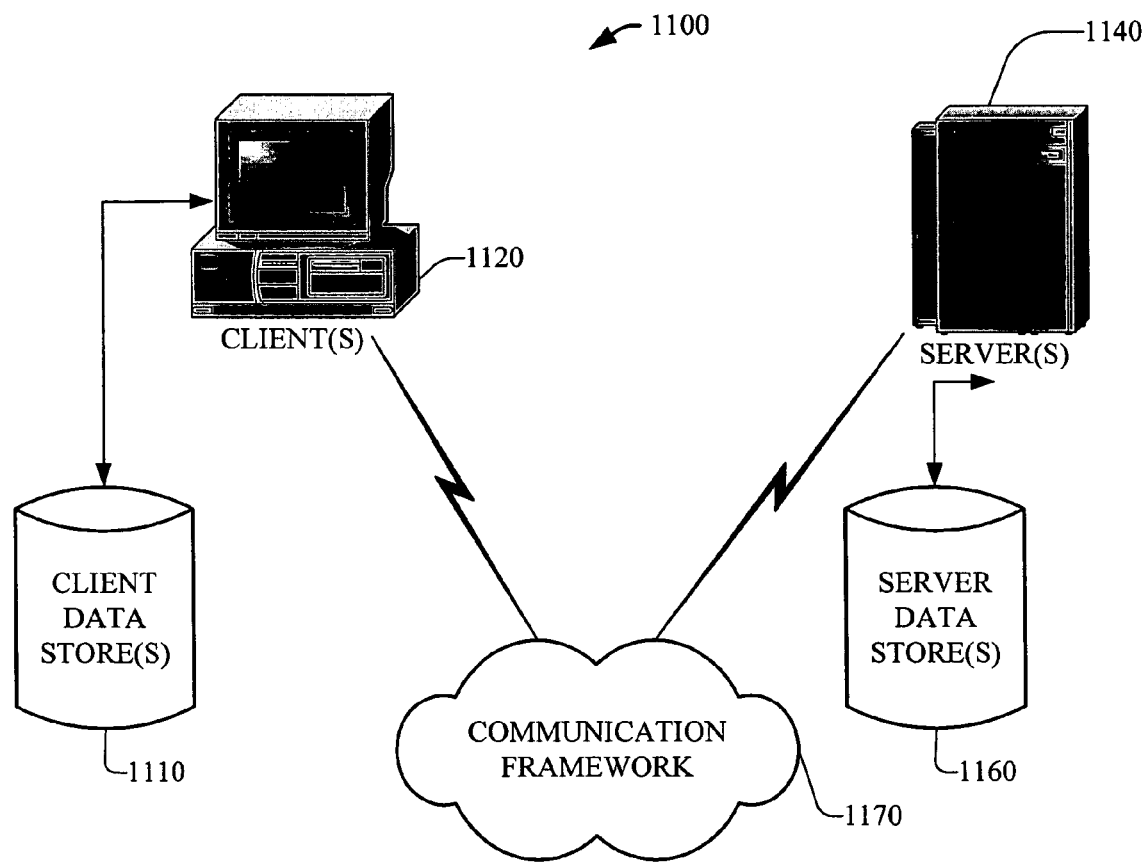
FIG. 11 illustrates a central host server system (e.g., associated with a construction unit), which can employ various aspects of the subject invention.

Referring now to FIG. 11, a central host—server system 1100 (e.g., associated with a construction unit), which can employ various aspects of the subject invention is illustrated. The central host 1120 can employ hardware and/or software (e.g., threads, processes, computing devices). The system 1100 also includes one or more server(s) 1140. The server(s) 1140 can also be hardware and/or software (e.g., threads, processes, computing devices) associated with for example operations and/or location and identification of construction units. For example, such servers 1140 can house threads to perform transformations by employing the subject invention. The central host 1120 and the server 1140 can communicate, in the form of data packets transmitted according to the subject invention, between two or more computer processes. The central host/server can also share the same process. As illustrated, the system 1100 includes a communication framework 1170 that can facilitate communications between the central host 1120 and the server(s) 1140. The central host 1120 is operationally connected to one or more data store(s) 1110 that can store information local to the host unit 1120. Moreover, the host 1120 can access and update databases 1160 located on a server computer 1140 running a server process. In one aspect of the subject invention, the communication frame work 1170 can be the internet, with the client process being a Web browser and the server process being a Web server. As such, a typical host 1120 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 1140 can be any computer, mainframe computers, or dedicated workstations, which can be with operation and control of the construction equipment.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A system that determines location of equipment on a construction site comprising:
   a locator component as part of a central host unit to search a network and locate an address of a welding equipment on the network, the network defined by a plurality of reference points;
   a mapping component that maps the network address to a physical location of the welding equipment, the welding equipment further comprising a welding component, a Wireless Application Protocol (WAP) client component facilitating transfer of information associated with the welding component between the welding component and at least one other device and a wireless communication component facilitating wireless communication between the WAP client component and the at least one other device;
   an input component to allow a user to build a desired cell configuration based on connections between a plurality of detected machines; and
   a display component to display a cell layout to the user.

2. The system of claim 1 further comprising a GPS system as part of the plurality of reference points or construction equipment.

3. The system of claim 1, the physical location determined by at least one of a Time Difference of Signal Arrival (TDOA) and probabilistic analysis of a wireless signal.

4. The system of claim 3 further comprising an artificial intelligence unit that facilitates determination of a physical location for a construction unit in relation to the reference points.

5. The system of claim 1 further comprising a portable wireless communication unit operably connected to the central host unit, to receive data regarding state of the construction equipment.

6. The system of claim 5, the data regarding the state of the construction equipment comprises at least one of a physical location, maintenance requirement, and operation status of the construction equipment.

7. The system of claim 1, the transfer of information occurs via at least one of a Wireless Mark-up Language (WML) document and a Wireless Mark-up Language script (WML script) document.

8. The system of claim 1, a WAP gateway component communicates with the central host unit via at least one of a wide area network, a local area network, the Internet and a personal area network.

9. The system of claim 1, further comprising a browsing component.

10. The system of claim 1, the transferred information being at least one of diagnostic information and error logs.

11. The system of claim 4, the artificial intelligence unit employs a support vector machine classifier.

12. The system of claim 1, the welding equipment is portable further comprising a rack system, a welding device with a power supply and a communication component.

13. The system of claim 12, the reference points supply information regarding the presence of the portable construction equipment.

14. The system of claim 1, the network is an IP network with a logical tree structure comprising at least a master device and an associated slave device.

15. The system of claim 1, the reference points are in communication with additional sub reference points to further delineate a triangular layout for higher resolution.

16. The system of claim 1, the central host unit comprises a measurement component that receives, as an input, a signal strength derived from wireless signal associated with the welding equipment.

17. A system that determines location of welding equipment on a construction site comprising:
   means for searching a networked area as defined by a plurality of reference points to determine network address of the welding equipment, the means for searching is part of a central host unit;
   means for mapping the physical location of the welding equipment on the network to its network address;
   means for transferring information associated with the equipment to at least one communication device by employing wireless application protocol (WAP), wherein the means for transferring is comprised within the welding equipment; and
   means for facilitating wireless communication between the means for information transfer and the at least one communication device;
   means to allow a user to build a desired cell configuration based on connections between a plurality of detected machines; and
   means for displaying a cell layout to the user.

18. The system of claim 17, the wireless communication means determines a priority level associated with the information generated by the WAP means.

19. The system of claim 17, further comprising artificial intelligence means for deriving an inference relating to the position of the equipment relative to location of the central host unit.

* * * * *